United States Patent [19]
Yu

[11] Patent Number: 5,706,939
[45] Date of Patent: Jan. 13, 1998

[54] CONTAINER FOR DISC

[76] Inventor: Jack Yu, No. 109-1, Avenue 6, Lane 164, Tzong Sa Road, Da Du Hsiang, Taichung Hsien, Taiwan

[21] Appl. No.: 774,678

[22] Filed: Dec. 26, 1996

[51] Int. Cl.[6] ................................. B65D 85/30
[52] U.S. Cl. .................. 206/308.1; 206/310; 206/312; 312/9.16; 312/9.48
[58] Field of Search .................. 206/308.1, 310, 206/312, 311, 308.3; 312/9.11, 9.16, 9.21, 9.22, 9.26, 9.47, 9.48

[56] References Cited

U.S. PATENT DOCUMENTS 4,747,484  5/1988  Ackeret ........................ 206/308.1
5,259,498  11/1993  Weisburn et al. ............. 206/308.1
5,474,174  12/1995  Lin ................................ 206/308.1

*Primary Examiner*—Paul T. Sewell
*Assistant Examiner*—Nhan T. Lam
*Attorney, Agent, or Firm*—Charles E. Baxley, Esq.

[57] ABSTRACT

A disc container includes a cover secured on a base for receiving an insert. The base has a block formed in the rear side portion for receiving a spring and a knob. The spring includes a protrusion extended inward of the base for engaging with a catch of the insert and for retaining the insert in the base. The insert may be moved outward of the base when the knob is depressed inward of the cover such that the container may be easily operated with only one hand. The knob can be prevented from being depressed inward of the cover inadvertently.

2 Claims, 3 Drawing Sheets

5,706,939

CONTAINER FOR DISC

BACKGROUND OF THE INVENTION

1. Field of the Invention

The present invention relates to a container, and more particularly to a container for storing a disc.

2. Description of the Prior Art

Typical disc containers comprise a base for storing disc and a cover pivotally coupled to the base for covering the disc. However, the user have to use both hands for opening the typical disc container.

The present invention has arisen to mitigate and/or obviate the afore-described disadvantages of the conventional disc containers.

SUMMARY OF THE INVENTION

The primary objective of the present invention is to provide a disc container that may be easily opened and closed.

In accordance with one aspect of the invention, there is provided a disc container comprising a base including a rear side portion having a block formed in the rear side portion of the base, the block including a cavity and a slit, a cover engaged on the base, the cover including a rear side portion having a recess and an orifice formed in the rear side portion of the cover, a spring and a knob engaged in the cavity of the block, the spring including a protrusion engaged in the slit and extended inward of the base, the knob being engaged in the orifice of the cover and engaged in the recess of the cover, an insert slidably engaged in the base, the insert including a catch for engaging with the protrusion of the spring and for allowing the protrusion to retain the insert in the base, and means for biasing the insert outward of the base. The catch of the insert is caused to engage with the protrusion of the spring when the insert is moved inward of the base, for allowing the protrusion to retain the insert in the base, the biasing means moves the insert outward of the base when the catch is disengaged from the protrusion of the spring and when the knob is depressed inward of the cover, and the knob is engaged in the recess of the cover for preventing the knob from being depressed inward of the cover inadvertently.

The base includes a front portion having a pair of flanges extended upward and including a rear portion having a wall extended upward, the flanges and the wall and the block each includes a projection for engaging with four holes of the cover and for allowing the cover to be secured to the base. The cover includes a pair of ears extended downward from the front portion for slidably engaging with the side shoulders of the insert.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
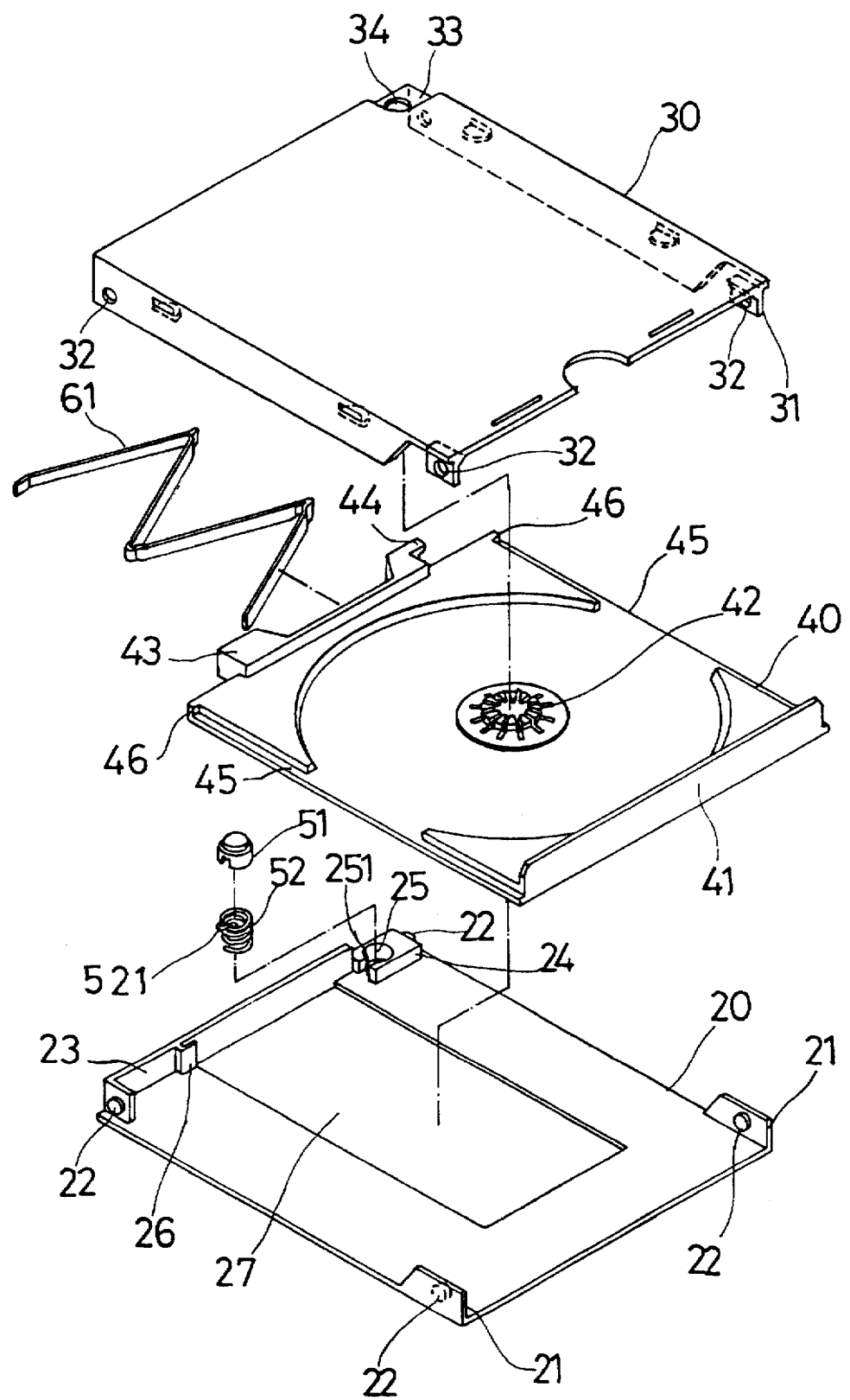
FIG. 1 is an exploded view of a disc container in accordance with the present invention.
Figure 2:
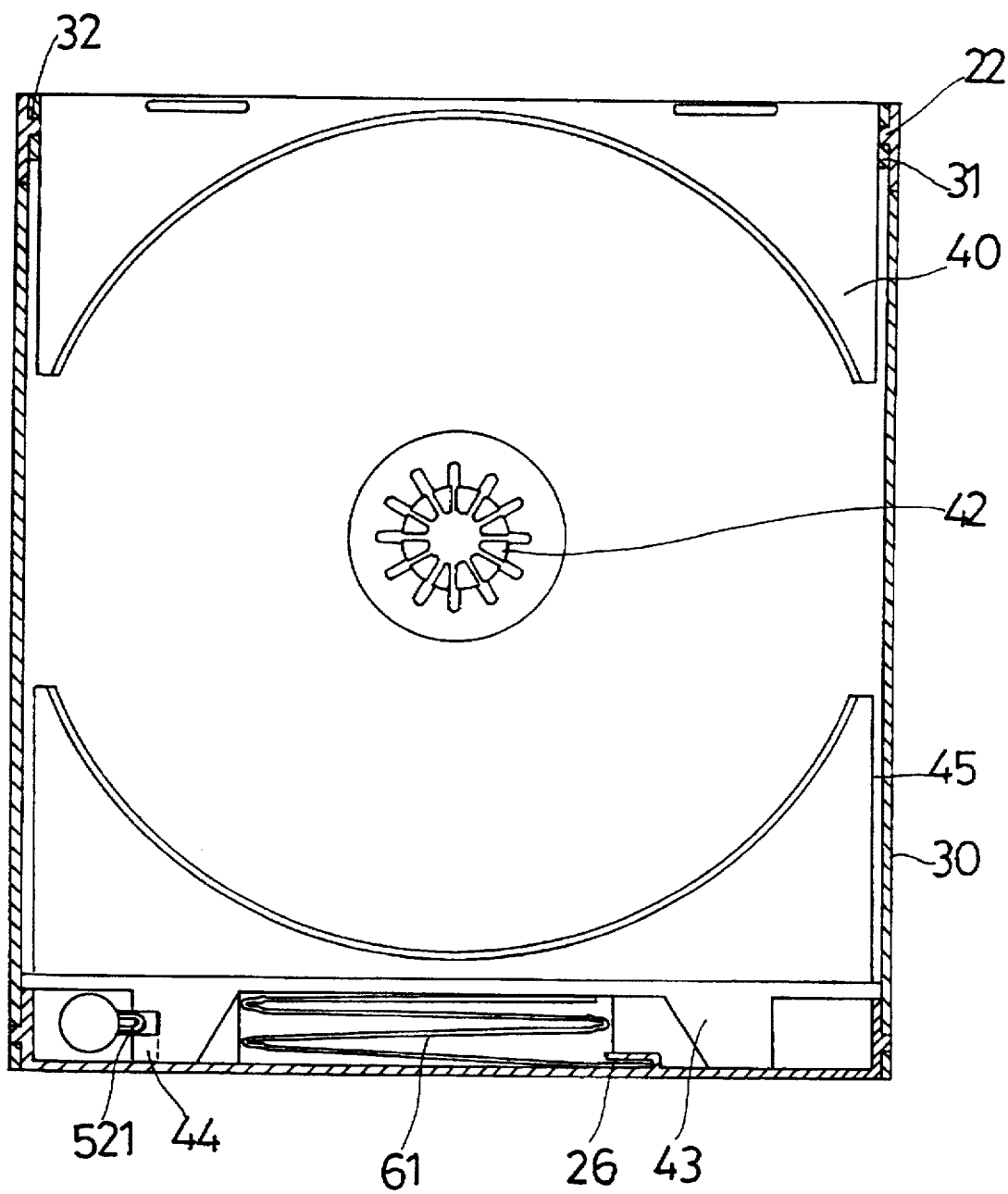
FIG. 2 is a cross sectional view taken along lines 2—2 of FIG. 3.
Figure 3:
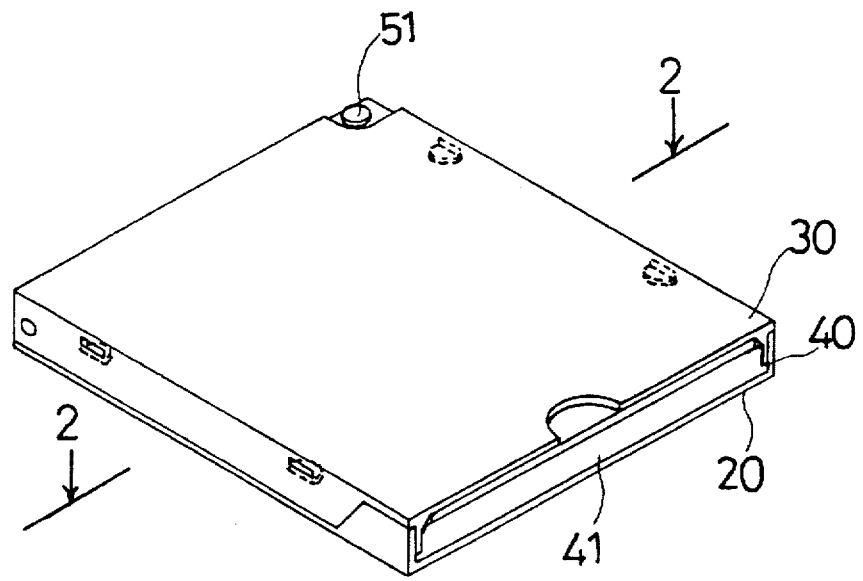
FIGS. 3 and 4 are perspective views illustrating the operation of the disc container.
Figure 4:
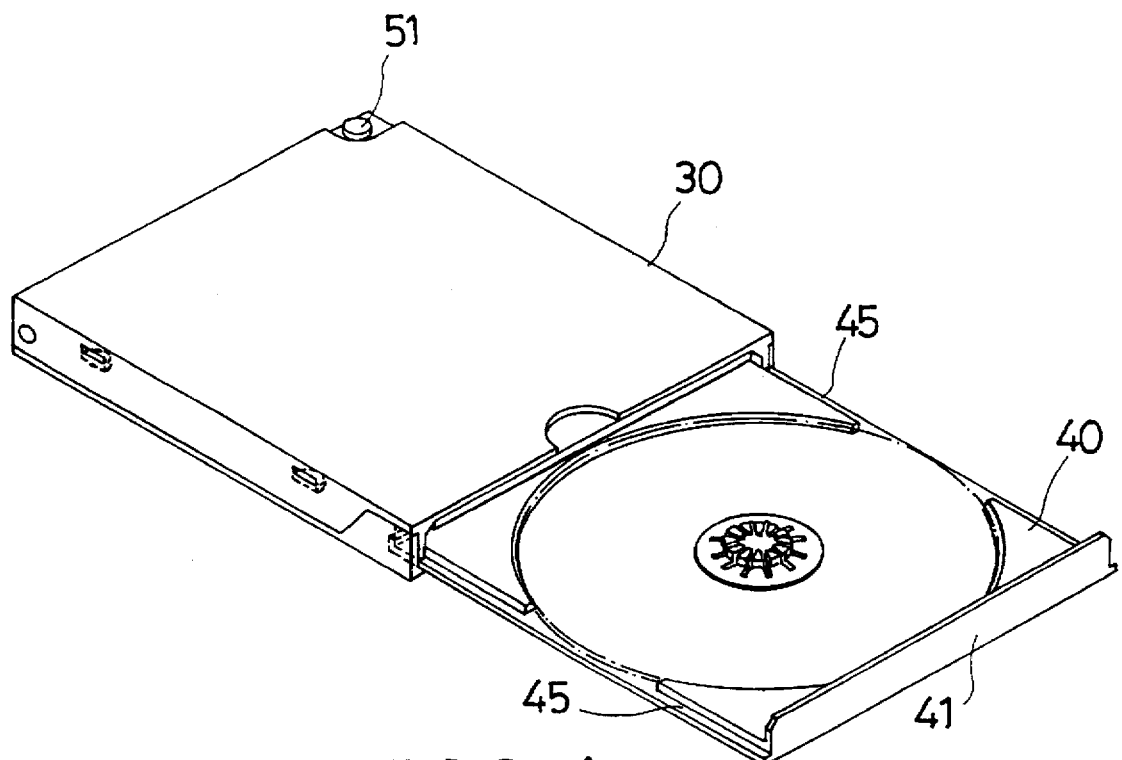

Referring to the drawings, and initially to FIGS. 1 to 3, a disc container in accordance with the present invention comprises a base 20 including a front portion having a pair of flanges 21 extended upward and including a rear portion having a wall 23 extended upward. A block 24 is formed on the rear side portion of the base 20. The wall 23 and the block 24 and the flanges 21 each includes a projection 22 for engaging with holes 32 of a cover 30 and for allowing the cover 30 to be easily secured to the base 20. The base 20 includes a depression 27 formed in the bottom and includes a retainer 26. The block 24 includes a cavity 25 for receiving a spring 52 and a knob 51. The block 24 includes a slit 251 for engaging with a protrusion 521 of the spring 52 and for allowing the protrusion 521 of the spring 52 to extend inward of the base 20. A spring member 61 is engaged in the depression 27 and includes one end engaged with the retainer 26 of the base 20.

The cover 30 includes two ears 31 formed on the front portion and having the holes 32 for engaging with the projections 22 of the flanges 21 of the base 20. The cover 30 includes a recess 33 formed in the rear side portion and includes an orifice 34 formed in the rear side portion for engaging with the knob 51 and for allowing the knob 51 to be extended upward into the recess 33 of the cover 30. The knob 51 is engaged in the recess 33 and may be prevented from being depressed inward of the cover 30 inadvertently.

An insert 40 is slidably engaged between the base 20 and the cover 30 and includes a front panel 41 and includes a flexible disc retaining hub 42 provided in the center portion. The insert 40 includes a seat 43 for engaging with the spring 61 and includes a catch 44 for engaging with the protrusion 521 of the spring 52 (FIG. 2) and for allowing the protrusion 521 to retain the insert 40 in the container. The insert 40 includes two shoulders 45 formed in the side portion for engaging with the ears 31 of the cover 30 and for guiding the sliding movement of the insert 40 relative to the cover 30 and the base 20. The insert 40 includes two stops 46 for engaging with the ears 31 and for preventing the insert 40 from disengaging from the container.

In operation, as shown in FIGS. 2 and 3, when the insert 40 is moved inward of the base 20 and the cover 30 until the catch 44 is engaged with the protrusion 521 of the spring 52, the insert 40 may be retained in place within the base 20 and the cover 30. However, when the knob 51 is depressed inward of the cover 30 for disengaging the protrusion 521 of the spring 52 from the catch 44 of the insert 40, the insert 40 may be moved outward by the spring 61, such that the disc container may be easily opened with only one hand.

Accordingly, the disc container in accordance with the present invention includes an insert which may be easily opened and operated with only one hand. In addition, the knob 51 is engaged in the recess 33 of the cover 30 and may thus be prevented from being depressed inward of the cover 30 when a number of disc containers are stacked or superposed with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A disc container comprising:

a base including a rear side portion having a block formed in said rear side portion of said base, said block including a cavity and a slit, a cover engaged on said base, said cover including a rear side portion having a recess and an orifice formed in said rear side portion of said cover, a spring and a knob engaged in said cavity of said block, said spring including a protrusion engaged in said slit and extended inward of said base, said knob being engaged in said orifice of said cover and engaged in said recess of said cover, an insert slidably engaged in said base, said insert including a catch for engaging with said protrusion of said spring and for allowing said protrusion to retain said insert in said base, and means for biasing said insert outward of said base, said catch of said insert being caused to engage with said protrusion of said spring when said insert is moved inward of said base, for allowing said protrusion to retain said insert in said base, said biasing means moving said insert outward of said base when said catch is disengaged from said protrusion of said spring and when said knob is depressed inward of said cover, and said knob being engaged in said recess of said cover for preventing said knob from being depressed inward of said cover inadvertently.

2. A disc container comprising:

a base including a rear side portion having a block formed in said rear side portion of said base, said block including a cavity and a slit, said base including a front portion having a pair of flanges extended upward and including a rear portion having a wall extended upward, said flanges and said wall and said block each including a projection, a cover including four holes for engaging with said projections of said base and for allowing said cover to be secured to said base, said cover including a rear side portion having a recess and an orifice formed in said rear side portion of said cover, said cover including a front portion having a pair of ears extended downward, a spring and a knob engaged in said cavity of said block, said spring including a protrusion engaged in said slit and extended inward of said base, said knob being engaged in said orifice of said cover and engaged in said recess of said cover, an insert slidably engaged in said base, said insert including a catch for engaging with said protrusion of said spring and for allowing said protrusion to retain said insert in said base, said insert including two side portions each having a shoulder formed therein for engaging with said ears of said cover and for guiding an outward movement of said insert relative to said cover, and means for biasing said insert outward of said base, said catch of said insert being caused to engage with said protrusion of said spring when said insert is moved inward of said base, for allowing said protrusion to retain said insert in said base, said biasing means moving said insert outward of said base when said catch is disengaged from said protrusion of said spring and when said knob is depressed inward of said cover, and said knob being engaged in said recess of said cover for preventing said knob from being depressed inward of said cover inadvertently.

\* \* \* \* \*